(12) United States Patent
Loebe

(10) Patent No.: US 9,956,930 B2
(45) Date of Patent: May 1, 2018

(54) FIXING DEVICE FOR A LINE IN A VEHICLE

(71) Applicant: Robert Bosch GmbH, Stuttgart (DE)

(72) Inventor: Thomas Loebe, Eisennach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/510,317

(22) PCT Filed: Sep. 10, 2015

(86) PCT No.: PCT/EP2015/070675
§ 371 (c)(1),
(2) Date: Mar. 10, 2017

(87) PCT Pub. No.: WO2016/058758
PCT Pub. Date: Apr. 21, 2016

(65) Prior Publication Data
US 2017/0297516 A1    Oct. 19, 2017

(30) Foreign Application Priority Data

Oct. 17, 2014    (DE) ........................ 10 2014 221 104

(51) Int. Cl.
*F16L 3/08*    (2006.01)
*F16L 3/12*    (2006.01)
(Continued)

(52) U.S. Cl.
CPC ........ *B60R 16/0215* (2013.01); *F16L 3/1075* (2013.01)

(58) Field of Classification Search
USPC ................. 248/71, 68.1, 73, 74.2, 74.4, 74.1
See application file for complete search history.

(56) References Cited

U.S. PATENT DOCUMENTS 3,913,187 A * 10/1975 Okuda .................. F16L 3/1075
                                                                24/16 PB
4,248,459 A    2/1981 Pate et al.
(Continued)

FOREIGN PATENT DOCUMENTS

| DE | 10 2011 010 998 A1 | 4/2012 |
| DE | 10 2010 043 565 A1 | 5/2012 |
| JP | 2013-013232 A | 1/2013 |

OTHER PUBLICATIONS

International Search Report corresponding to PCT Application No. PCT/EP2015/070675, dated Dec. 8, 2015 (German and English language document) (7 pages).

*Primary Examiner* — Terrell L McKinnon
*Assistant Examiner* — Michael McDuffie
(74) *Attorney, Agent, or Firm* — Maginot, Moore & Beck LLP

(57) ABSTRACT

A fastening device for a line in a vehicle includes a carrier, fixing structure, and fastening element. The carrier is configured to enclose the line and includes a multi-part base body having at least two partial base bodies and an inner region. The partial base bodies are adjustable between a premounted state, whereat the partial base bodies are disengaged from each other, and a mounted state, whereat the partial base bodies are engaged with each other such that the multi-part base body fully annularly encloses the line. The fixing structure is formed on the inner region of the base body and configured, in the mounted state, to fix the carrier axially on the line. The fastening element includes a fastening structure and holder that connects the fastening element to the carrier.

10 Claims, 2 Drawing Sheets

(51) Int. Cl.
    *B60R 16/02*    (2006.01)
    *F16L 3/10*    (2006.01)

(56) References Cited

U.S. PATENT DOCUMENTS

| | | | | |
|---|---|---|---|---|
| 4,478,381 A * | 10/1984 | Pittion | ............... | F16L 3/12 24/487 |
| 4,564,163 A | 1/1986 | Barnett | | |
| 4,840,345 A * | 6/1989 | Neil | ............... | F16L 3/12 24/16 PB |
| 5,015,013 A * | 5/1991 | Nadin | ............... | F16L 25/0045 285/419 |
| 5,820,048 A * | 10/1998 | Shereyk | ............... | F16L 3/1215 24/487 |
| 5,873,550 A * | 2/1999 | Phillips | ............... | F16L 3/1075 248/73 |
| 7,114,686 B2 * | 10/2006 | Andrigo | ............... | F16B 2/10 24/458 |
| 7,404,548 B2 * | 7/2008 | Kwilosz | ............... | B60R 16/0215 248/71 |
| 7,503,528 B2 * | 3/2009 | Adams | ............... | F16B 5/0685 24/297 |
| 7,520,475 B2 * | 4/2009 | Opperthauser | ............... | F16L 3/1211 139/149 |
| 7,784,745 B2 * | 8/2010 | Dodge | ............... | F16L 3/12 138/149 |
| 7,963,487 B2 * | 6/2011 | Saltenberger | ............... | F16L 3/1075 24/16 PB |
| 8,020,810 B2 * | 9/2011 | Dietrich | ............... | F16L 3/1025 248/63 |
| 8,286,923 B2 * | 10/2012 | Kobayashi | ............... | F16L 3/12 24/530 |
| 9,059,578 B2 * | 6/2015 | Sokolowski | ............... | G02B 6/4471 |
| 2002/0000499 A1 | 1/2002 | Aoki et al. | | |
| 2004/0108421 A1 * | 6/2004 | Yuta | ............... | B60N 3/046 248/71 |
| 2016/0003377 A1 * | 1/2016 | Denner | ............... | F16L 3/1075 248/74.1 |

* cited by examiner

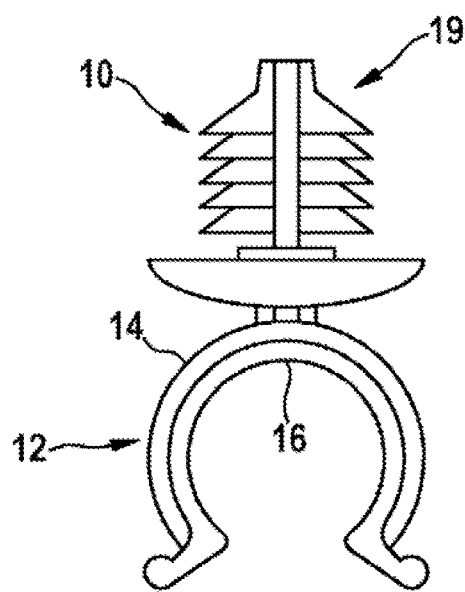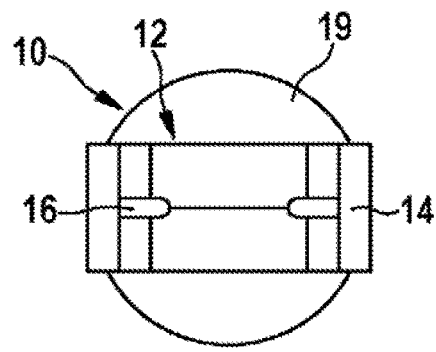
Fig. 4          Fig. 5
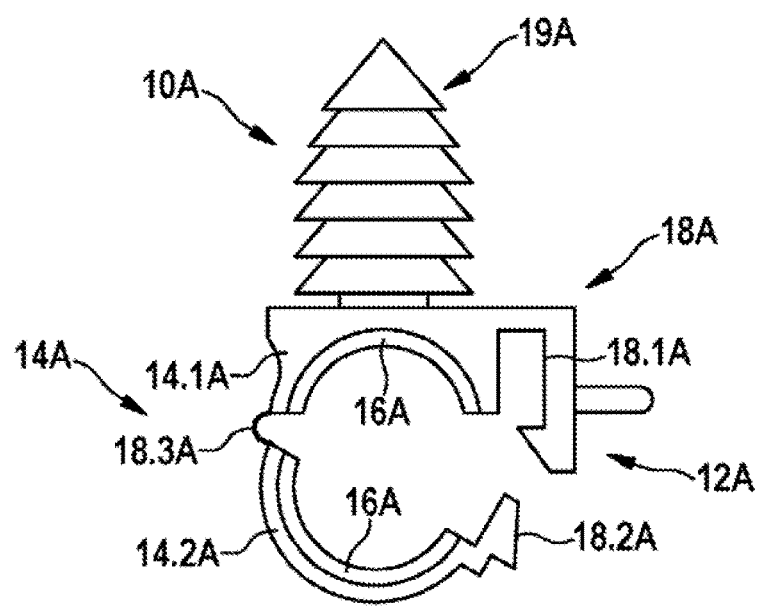
Fig. 6

FIXING DEVICE FOR A LINE IN A VEHICLE

This application is a 35 U.S.C. § 371 National Stage Application of PCT/EP2015/070675, filed on Sep. 10, 2015, which claims the benefit of priority to Serial No. DE 10 2014 221 104.2, filed on Oct. 17, 2014 in Germany, the disclosures of which are incorporated herein by reference in their entirety.

FIELD OF INVENTION

The disclosure relates to a fastening device for a line, in particular for an electric cable, in a vehicle.

BACKGROUND

Fastening devices for lines, in particular for electric cables, in a vehicle are known from the prior art, which fastening devices fix the radial and axial position of the fastening element with the fastening structure on the line. Such electric cables are used in the vehicle, for example, for electric connection of sensors, which are arranged at a cable end, with corresponding evaluation and control switches which are arranged at the other cable end. Here, in particular the definition of the radial position of the fastening structure during sensor production is difficult as a result of the demands on the casing material of the cable and the uncontrolled radial position of the injection molded sensor head which is connected directly to the cable. This leads to large radial tolerances for the fastening structures which can lead to problems during subsequent mounting of the cable in the vehicle. The fastening structure of the fastening device, after installation of the sensor, can be arranged at an incorrect radial position in relation to a fastening opening in the vehicle body so that the cable has to be rotated so that the fastening structure can be introduced into the fastening opening. This can lead to undesired torsional loading of the cable.

DE 10 2010 043 565 A1 discloses, for example, a fastening device for a line, in particular for an electric cable in a vehicle, which fastening device has a protective sleeve which can enclose the line and with which the line can be locked on a holder. For this purpose, the protective sleeve has a contour which can be fastened detachably in a recess of the holder. The protective sleeve is formed at least partially with an elastically deformable material. The protective sleeve has at least two protective sleeve sub-regions which can be separated at least partially from one another in such a manner that the line, in a premounted state, can be placed into an inner region of the protective sleeve, and which can furthermore be connected to one another in such a manner that the line, in a mounted state, is enclosed in a fully annular manner by the protective sleeve sub-regions which are connected to one another. Both protective sleeve sub-regions can in this case be two entirely separate components which, in the premounted state, i.e. before the protective sleeve is assembled around the line, can be fully separated from one another. For the mounted state, the protective sleeve sub-regions can then be assembled and connected to one another in order to enclose the line in a fully annular manner. In this mounted state, the protective sleeve can then be locked on the holder and thus fix the line in a sealing manner on the holder. Alternatively, the protective sleeve sub-regions can, already in the premounted state, be connected to one another at least in sub-regions. In this case, however, both protective sleeve sub-regions have at least in each case one side edge which, in the premounted state, are not connected to one another. The line can be placed into the protective sleeve at this side edge.

SUMMARY

The fastening device according to the disclosure for a line in a vehicle has the advantage over this that the fastening device is embodied in multiple parts with a carrier and a fastening element. Here, the carrier encloses the line fully in a mounted state and is axially fixed on the line via a fixing structure. The fastening element is advantageously detachably and radially movably connected to the carrier and can, in the mounted state, be moved easily and quickly and without any or with little force outlay into a desired radial position. A simple and rapid replacement of the fastening element is possible as a result of the detachable connection between the carrier and the fastening element.

Embodiments of the present disclosure make available a fastening device for a line, in particular for an electric cable, in a vehicle, which fastening device comprises a carrier enclosing the line, which carrier has a multi-part base body with at least two partial base bodies which can be separated at least partially from one another in such a manner that an inner region of the base body, in a premounted state, can be placed around the line, and which can be connected to one another in such a manner that the base body of the carrier, in a mounted state, encloses the line in a fully annular manner. According to the disclosure, a fixing structure is formed on the inner region of the base body, which fixing structure fixes, in the mounted state, the carrier on the line. A fastening element is also provided with a fastening structure and a holder which connects the fastening element radially movably to the carrier. The fastening element can then interact with a corresponding fastening element on the vehicle body side, which is embodied, for example, as a fastening opening, in order to fasten the line in the vehicle.

Advantageous improvements of the fastening device for a line in a vehicle are possible as a result of the measures and further developments provided by additional features of the descriptions, drawings, and claims.

It is particularly advantageous that the fixing structure can be formed as a rib structure with at least one radially running rib and/or at least one axially running rib which, in the mounted state, generate(s) at least one recess in the casing of the line. The base body of the carrier thus has at least a greater hardness than the casing of the line in order to generate the recesses in the line casing for fixing the carrier. The rib structure can comprise at least one radially running rib in order to axially fix the carrier on the line. The rib structure can additionally have axially running ribs in order to fix the carrier radially on the line.

In a further advantageous configuration of the fastening device according to the disclosure, a first holding structure can be formed on the outer circumference of the base body. The first holding structure can be formed, for example, as a circumferential annular recess with a U-shaped cross-section.

In a further advantageous configuration of the fastening device according to the disclosure, the holder can have a base body with a round inner region which, in the mounted state, can at least partially enclose the carrier. Moreover, a second holding structure can be formed on the inner region of the base body which, in the mounted state, can engage into the first holding structure. The second holding structure can be formed, for example, as a radial rib. The wall of the annular recess, into which the radial rib engages, advantageously enables an axial guiding of the holder of the fastening element so that the axial position of the fastening element does not change during a rotational movement into the desired radial position.

In a further advantageous configuration of the fastening device according to the disclosure, the holder can have a spring-elastic C-shaped base body which is guided in a manner clipped onto the base body of the carrier and radially movably. This enables particularly simple and rapid connection of the fastening element to the carrier. The second holding structure embodied as a radial rib can be arranged, for example, centrally on the inner region of the base body and engage into the first holding structure embodied as an annular recess. As a result, an axial movement of the holder with the fastening contour can be advantageously prevented, while a radial movement of the holder with the fastening contour still remains possible. The spring-elastic C-shaped base body of the holder also enables simple and rapid mounting and dismounting of the line in the vehicle. The base body of the holder can be pushed onto the carrier and pulled off from it with a defined expenditure of force.

Alternatively, the holder can have a multi-part base body with at least two partial base bodies which can be at least partially separated from one another in such a manner that the base body of the holder, in a premounted state, can be placed with its inner region around the base body of the carrier and which can be connected to one another in such a manner that the base body of the holder, in a mounted state, encloses the base body of the carrier in a fully annular manner. The partial base bodies of the holder, in the premounted state, can also be connected to one another in each case along a side edge via an integrated joint, wherein the partial base bodies of the holder, in the mounted state, can be connected to one another by an additional form-fitting connection. The base body of the holder can preferably comprise two partial base bodies which have in each case a semi-circular inner region on which the second holding structure embodied as a radial rib can be arranged approximately centrally. The partial base bodies, in the premounted state, can be connected to one another in each case along a side edge via an integrated joint. The joint can be embodied, for example, as a plastic skin, hinge or tension spring. The partial base bodies which are connected to one another at a side edge can thus be easily placed around the carrier via the open side edges so that the radial rib can engage into the first holding structure embodied as an annular recess. The partial base bodies can be connected to one another via a form-fitting connection on the in each case open side edge.

Exemplary embodiments of the disclosure are represented in the drawings and are explained in greater detail in the following description. In the drawings, identical reference numbers designate components or elements which perform identical or analogous functions.

BRIEF DESCRIPTION OF THE DRAWINGS

FIG. 4 shows a schematic representation of an exemplary embodiment of a fastening element for the fastening device according to the disclosure for a line in a vehicle from FIG. 1.

FIG. 5 shows a schematic representation of the exemplary embodiment of the fastening element from FIG. 4 from below.

FIG. 6 shows a schematic representation of a further exemplary embodiment of a fastening element for the fastening device according to the disclosure for a line in a vehicle from FIG. 1.

DETAILED DESCRIPTION

Figure 1:
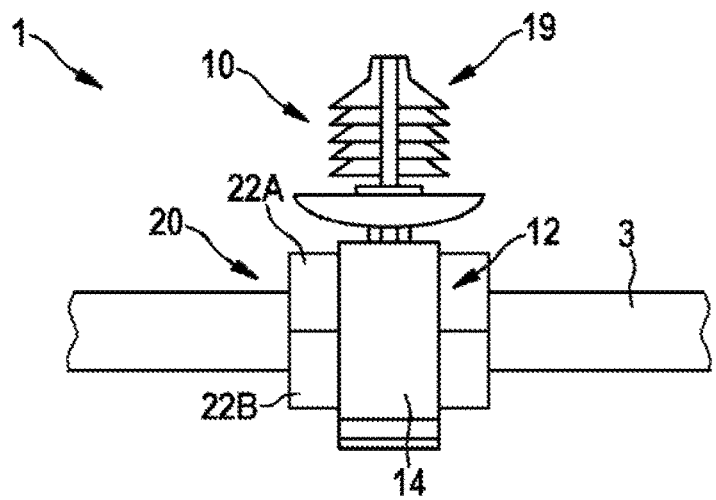
FIG. 1 shows a schematic representation of an exemplary embodiment of a fastening device according to the disclosure for a line in a vehicle in the mounted state.

As is apparent from FIGS. 1 to 6, the represented exemplary embodiments of a fastening device 1 according to the disclosure for a line (3), in particular for an electric cable, in a vehicle, comprise in each case a carrier 20 which encloses line 3 and has a multi-part base body 22 with at least two partial base bodies 22A, 22B which can be separated at least partially from one another in such a manner that an inner region of base body 22, in a premounted state, can be placed around line 3 and which can be connected to one another in such a manner that base body 22 of carrier 20, in a mounted state, encloses line 3 in a fully annular manner. A fixing structure 26 which, in the mounted state, axially fixes carrier 20 on line 3 is formed according to the disclosure on the inner region of base body 22. In this case, a fastening element 10, 10A has a fastening structure 19, 19A and a holder 12, 12A which connects fastening element 10, 10A detachably and radially movably to carrier 20.

Figure 3:
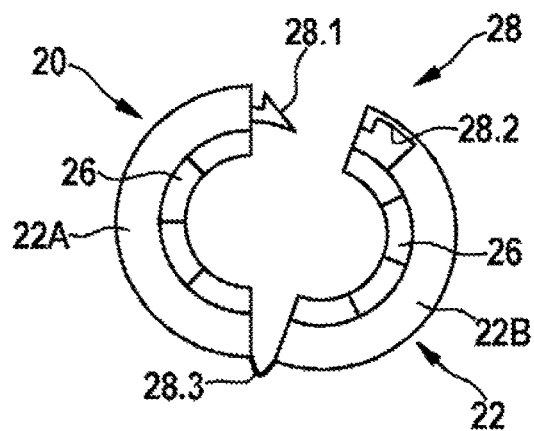
FIG. 3 shows a schematic representation of the exemplary embodiment of the carrier from FIG. 2 prior to mounting.

As is further apparent from FIG. 3, fixing structure 26 is, in the represented exemplary embodiment, formed as a rib structure with a radially running rib and several axially running ribs which, in the mounted state, generate at least one recess in the casing of line 3. Base body 22 of carrier 20 or the ribs thus have at least a greater hardness than the casing of line 3 in order to generate the recesses in the line casing for fixing of carrier 20. Base body 22 of carrier 20 is preferably manufactured as an injection molded part made of a plastic, such as, for example, a polyamide (PA6.6) which has good rigidity, hardness, abrasion resistance and dimensional stability under heat. Other suitable plastics for producing base body 22 can of course also be used.

As a result of this rib structure, base body 22 of carrier 20 is fixed axially and radially on line 3. In the case of an exemplary embodiment which is not represented, fixing structure 26 embodied as a rib structure comprises at least one radially running rib in order to fix carrier 20 axially on line 3. Base body 22 of carrier 20 comprises, in the exemplary embodiment represented, two semi-circular partial base bodies 22A, 22B which, in the premounted state, are connected to one another in each case along a side edge via an integrated joint 28.3. In the represented exemplary embodiment, joint 28.3 is embodied as a plastic skin. Alternatively, joint 28.3 can be embodied, for example, as a hinge or tension spring. Partial base bodies 22A, 22B which are connected to one another on a side edge can be easily placed around line 3 via the open side edges. On the in each case open side edge, partial base bodies 22A, 22B can be connected to one another via a mechanical connection 28. Mechanical connection 28 is, in the represented exemplary embodiment, embodied as a form-fitting clip connection with corresponding interacting connecting contours 28.1, 28.2 which can be pushed into one another so that base body 22 of carrier 20 encloses line 3, in the mounted state, in a fully annular manner. In the represented exemplary embodiment, a first partial base body 22A comprises a first connecting contour 28.1 which is embodied as a lug and which interacts in a latching manner with a corresponding second connecting contour 28.2, embodied as a latching recess, of a second partial base body 22B.

Figure 2:
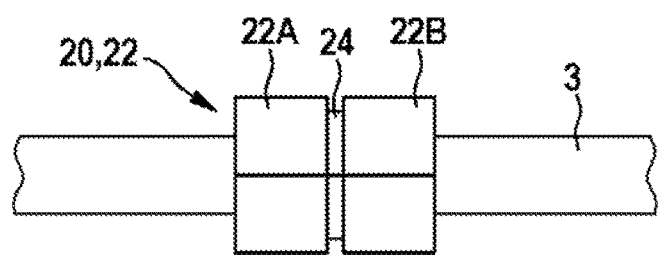
FIG. 2 shows a schematic representation of an exemplary embodiment of a carrier for the fastening device according to the disclosure for a line in a vehicle from FIG. 1 in the mounted state.

As is further apparent from FIG. 2, a first holding structure 24 is formed on the outer circumference of base body 22. In the represented exemplary embodiment, first holding structure 24 is formed as a circumferential annular recess with a U-shaped cross-section which is arranged approximately centrally on base body 22.

As is further apparent from FIGS. 1, 4 and 6, fastening structures 19, 19A of the represented exemplary embodiments of fastening element 10, 10A are embodied in each case as pine tree clips which can be clipped into a corresponding fastening opening, not represented, in the vehicle body. Of course, the fastening structures can also have another suitable form in order to be fastened on the vehicle body. Holders 12, 12A of the represented exemplary embodiments of fastening element 10, 10A have in each case a base body 14, 14A with a round inner region which, in the mounted state, at least partially encloses carrier 20. Moreover, a second holding structure 16, 16A is formed on the inner region of base body 14, 14A which, in the mounted state, engages in first holding structure 24 of carrier 20, In the case of the represented exemplary embodiments, second holding structure 16, 16A is formed in each case as a radial rib.

As is further apparent from FIGS. 4 and 5, holder 12 has, in the represented exemplary embodiment, a spring-elastic C-shaped base body 14 which clips onto base body 22 of carrier 20 and is guided radially movably. Second holding structure 16 embodied as a radial rib is arranged centrally on the inner region of base body 14 and engages, in the mounted state, into first holding structure 24 embodied as an annular recess. As a result, an axial movement of fastening element 10 can be advantageously prevented, while a radial movement of fastening element 10 is furthermore possible and fastening element 10 can be rotated into the desired radial position. As a result of spring-elastic C-shaped base body 14, base body 14 of holder 12 can be pushed onto base body 22 of the carrier or pulled from it via the opening with a defined expenditure of force.

As is furthermore apparent from FIG. 6, holder 12A has, in the represented exemplary embodiment, a multi-part base body 14A with at least two partial base bodies 14.1A, 14.2A. Partial base bodies 14.1A, 14.2A can be separated from one another at least partially such that base body 14A of holder 12A, in a premounted state, can be placed with its inner region around base body 22 of carrier 20. Partial base bodies 14.1A, 14.2A can furthermore be connected to one another in such a manner that base body 14A of holder 12A, in a mounted state, encloses base body 22 of carrier 20 in a fully annular manner.

As is furthermore apparent from FIG. 6, base body 14A of holder 12 has, in the represented exemplary embodiment, two partial base bodies 14.1A, 14.2A which have in each case a semi-circular inner region on which second holding structure 16A embodied as a radial rib is arranged approximately centrally. Partial base bodies 14.1A, 14.2A of base body 14A are, in the represented premounted state, connected to one another in each case along a side edge via an integrated joint 18.3A. In the represented exemplary embodiment, joint 18.3A is embodied as a plastic skin. Alternatively, joint 18.3 can be embodied, for example, as a hinge or tension spring. Partial base bodies 14.1A, 14.2A connected to one another on a side edge can be easily placed around base body 22 of carrier 20 via the open side edges so that holding structure 16A embodied as a radial rib can engage in first holding structure 24 embodied as an annular recess. Partial base bodies 14.1A, 14.2A can be connected to one another via a form-fitting connection 18A at the in each case open side edge. Form-fitting connection 18A is, in the represented exemplary embodiment, embodied as a clip connection with corresponding interacting connecting contours 18.1A, 18.2A which can be pushed into one another so that base body 14A of holder 12A encloses base body 22 of carrier 20 in a fully annular manner. In the represented exemplary embodiment, a first partial base body 14.1A of holder 12A comprises a first connecting contour 28.1 which is embodied as a latching recess and which interacts in a latching manner with a corresponding second connection contour 28.2, embodied as a lug, of a second partial base body 14.2A of holder 12A.

The invention claimed is:

1. A fastening device for a line in a vehicle, comprising:
a carrier configured to enclose the line and including a multi-part base body having at least two partial base bodies and defining an inner region, the at least two partial base bodies being adjustable between:
a premounted state, in which the at least two partial base bodies are disengaged from each other so as to enable placement of the inner region of the multi-part base body around the line; and
a mounted state, in which the at least two partial base bodies are engaged with each other such that the multi-part base body of the carrier fully annularly encloses the line;
a fixing structure formed on the inner region of the multi-part base body and configured such that, in the mounted state of the at least two partial base bodies, the fixing structure axially fixes the carrier on the line; and
a fastening element including a fastening structure and a holder that connects the fastening element to the carrier in such a way that, in the mounted state of the at least two partial base bodies, the fastening element is detachable from the carrier and is radially movable relative to the carrier.

2. The fastening device as claimed in claim 1, wherein:
the fixing structure includes a rib structure having at least one of (i) at least one radially running rib and (ii) at least one axially running rib; and
the rib structure is configured such that, in the mounted state of the at least two partial base bodies, the rib structure forms at least one recess in a casing of the line.

3. The fastening device as claimed in claim 1, further comprising a first holding structure formed on an outer circumference of the multi-part base body.

4. The fastening device as claimed in claim 3, wherein the first holding structure includes a circumferential annular recess having a U-shaped cross-section.

5. The fastening device as claimed in claim 1, wherein:
the holder includes a holder base body having a round inner region; and
the holder base body is configured such that, in the mounted state of the at least two partial base bodies, the holder base body at least partially encloses the carrier.

6. A fastening device for a line in a vehicle, comprising:
a carrier configured to enclose the line and including a multi-part base body having at least two partial base bodies and defining an inner region, the at least two partial base bodies being adjustable between:

a premounted state, in which the at least two partial base bodies are disengaged from each other so as to enable placement of the inner region of the multi-part base body around the line; and a mounted state, in which the at least two partial base bodies are engaged with each other such that the multi-part base body of the carrier fully annularly encloses the line;

a fixing structure formed on the inner region of the multi-part base body and configured such that, in the mounted state of the at least two partial base bodies, the fixing structure axially fixes the carrier on the line;

a fastening element including a fastening structure and a holder that connects the fastening element to the carrier such that the fastening element is detachable from the carrier and is radially movable relative to the carrier; and a first holding structure formed on an outer circumference of the multi-part base body, wherein:

the holder includes a holder base body having a round inner region;

the holder base body is configured such that, in the mounted state of the at least two partial base bodies, the holder base body at least partially encloses the carrier;

the fastening device further comprises a second holding structure that is formed on the round inner region of the holder base body and that is configured such that, in the mounted state of the at least two partial base bodies, the second holding structure engages the first holding structure.

7. The fastening device as claimed in claim 6, wherein the second holding structure includes a radial rib.

8. The fastening device as claimed in claim 1, wherein:

the holder includes a spring-elastic C-shaped base body; and the spring-elastic C-shaped body is movable in a radial direction and is configured to clip onto the multi-part base body of the carrier.

9. A fastening device for a line in a vehicle, comprising:

a carrier configured to enclose the line and including a multi-part base body having at least two partial base bodies and defining an inner region, the at least two partial base bodies being adjustable between:

a premounted state, in which the at least two partial base bodies are disengaged from each other so as to enable placement of the inner region of the multi-part base body around the line; and a mounted state, in which the at least two partial base bodies are engaged with each other such that the multi-part base body of the carrier fully annularly encloses the line;

a fixing structure formed on the inner region of the multi-part base body and configured such that, in the mounted state of the at least two partial base bodies, the fixing structure axially fixes the carrier on the line; and a fastening element including a fastening structure and a holder that connects the fastening element to the carrier such that the fastening element is detachable from the carrier and is radially movable relative to the carrier, wherein:

the holder includes a multi-part holder base body having at least two partial holder base bodies and defining an inner holder region, the at least two partial holder base bodies being adjustable between:

a holder premounted state, whereat the at least two partial holder base bodies are disengaged from each other so as to enable placement of the inner holder region of the holder base body around the multi-part base body of the carrier; and a holder mounted state, whereat the at least two partial base bodies are engaged with each other such that the holder base body fully annularly encloses the multi-part base body of the carrier.

10. The fastening device as claimed in claim 9, wherein:

the at least two partial holder base bodies are configured such that, in the premounted state of the at least two partial holder base bodies, the at least two partial holder base bodies are connected to each other along respective side edges via an integrated joint; and the at least two partial holder base bodies are configured such that, in the mounted state of the at least two partial holder base bodies, the at least two partial holder base bodies of the holder are connected to each other via a form-fitting connection.

\* \* \* \* \*

UNITED STATES PATENT AND TRADEMARK OFFICE
CERTIFICATE OF CORRECTION

PATENT NO. : 9,956,930 B2
APPLICATION NO. : 15/510317
DATED : May 1, 2018
INVENTOR(S) : Loebe It is certified that error appears in the above-identified patent and that said Letters Patent is hereby corrected as shown below:

On the Title Page

In item (72), Inventor Thomas Loebe's residence should read "Eisenach (DE)"

Signed and Sealed this
Thirty-first Day of July, 2018

Andrei Iancu
*Director of the United States Patent and Trademark Office*